(12) United States Patent
Leason

(10) Patent No.: US 7,397,378 B1
(45) Date of Patent: Jul. 8, 2008

(54) SELECTIVELY RESPONSIVE TAG SUITABLE FOR RFID SYSTEMS AND THE LIKE

(75) Inventor: David Leason, Chappaqua, NY (US)

(73) Assignee: Leason Holdings Company, L.L.C., Chappaqua, NY (US)

( * ) Notice: Subject to any disclaimer, the term of this patent is extended or adjusted under 35 U.S.C. 154(b) by 241 days.

(21) Appl. No.: 11/307,617

(22) Filed: Feb. 15, 2006

Related U.S. Application Data

(60) Provisional application No. 60/593,876, filed on Feb. 21, 2005.

(51) Int. Cl.
*G08B 13/14* (2006.01)
(52) U.S. Cl. .............. 340/572.7; 340/572.1; 340/572.8; 340/10.1; 340/10.5
(58) Field of Classification Search .............. 340/572.7, 340/572.1, 572.8, 10.1, 10.5
See application file for complete search history.

(56) References Cited

U.S. PATENT DOCUMENTS

| | | | |
|---|---|---|---|
| 6,480,110 B2 * | 11/2002 | Lee et al. .................. | 340/572.5 |
| 7,148,424 B1 * | 12/2006 | Altschul et al. ............. | 174/250 |
| 7,277,016 B2 * | 10/2007 | Moskowitz et al. ...... | 340/572.3 |
| 2007/0024445 A1 * | 2/2007 | Weslake et al. .......... | 340/572.1 |

* cited by examiner

*Primary Examiner*—George Bugg
*Assistant Examiner*—Travis Hunnings
(74) *Attorney, Agent, or Firm*—Leason Ellis LLP

(57) ABSTRACT

A tag for RFID applications and the like comprises an antenna supported on a dielectric substrate and having a first electrical length suitable for communication as a transponder. A selectively removable conductive shunt causes the antenna to assume a second electrical length which impedes transponder communication. Applications of the tag include tag-bearing products that are non-transmissive beneath surrounding packaging, and state machines that change between transmissive and non-transmissive states with selective shunting of the antenna. A method for enhancing an RFID tag for selective operation is also provided.

21 Claims, 3 Drawing Sheets

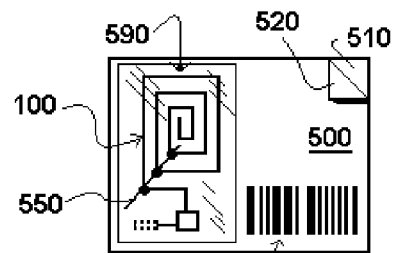
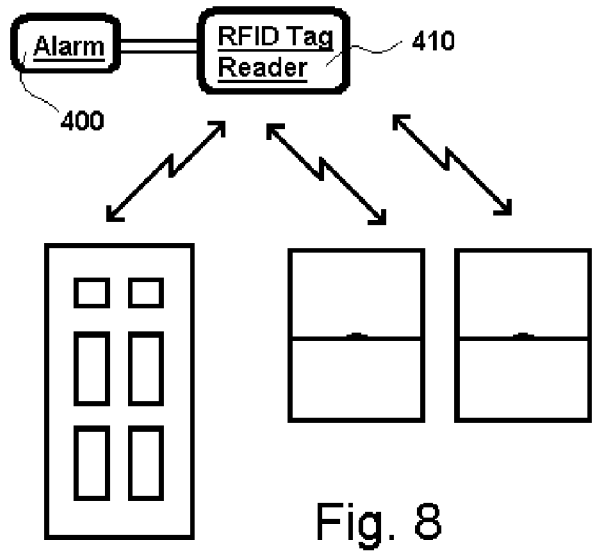
Fig. 8
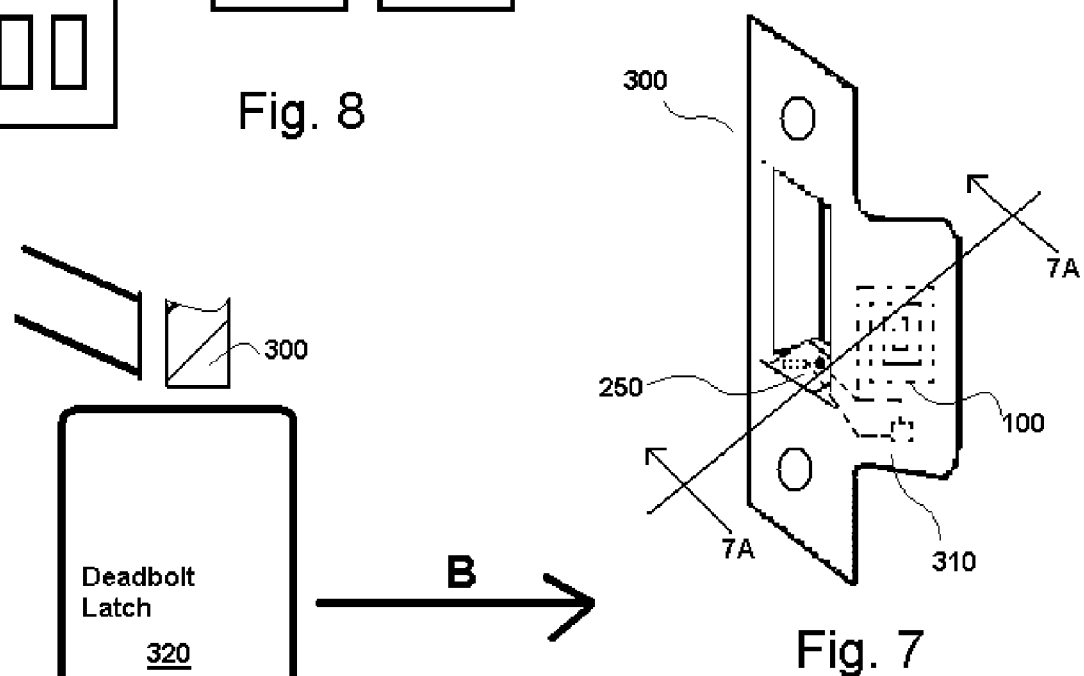
Fig. 9
Fig. 7
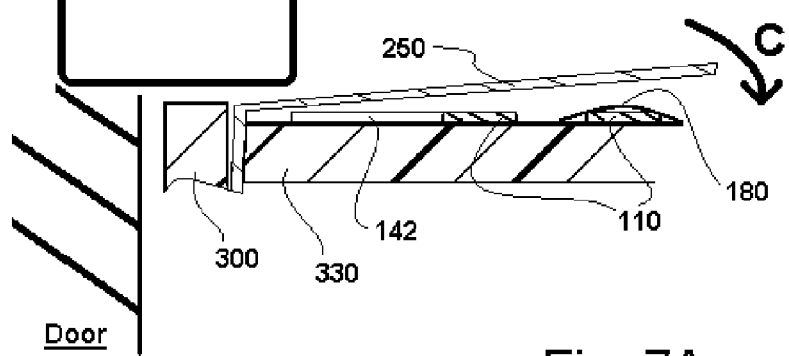
Fig. 7A

SELECTIVELY RESPONSIVE TAG SUITABLE FOR RFID SYSTEMS AND THE LIKE

FIELD OF THE INVENTION

The present invention relates to tags such as RFID tags that respond to radio stimuli, and more particularly to a modifiable tag structure that changes an antenna characteristic of the tag at least from one which is ineffective in communicating with a tag reader to one that communicates with the tag reader.

BACKGROUND OF THE INVENTION

RFID tags of conventional design cooperate with a reader to identify their presence in response to a signal having prescribed characteristics. In a typical RFID system, transponders (commonly referred to as "tags") are attached to objects. Each tag can carry with it any imaginable data such as a serial or model number, a date of manufacture, or a country of origin or assembly. When these tags pass through a field generated by a compatible reader, they transmit or reflect signals back to the reader, thereby identifying the object. A multiplicity of tags can be manufactured and applied to products so as to uniquely identify a corresponding number of products. An exemplary application of RFIDs tags is to replace or supplement traditional bar codes that are disposed on products. One future benefit that has been mentioned in the press is that products in a shopping cart can be sensed in parallel and purchases tallied simply by moving the cart proximate to a reader, instead of requiring the products in the cart to have their bar codes scanned in a serial manner.

The ability of an RFID tag to be read from a distance has numerous other applications. For instance, there are circumstances in which it is desirable to include an RFID tag on a product in order to authenticate the item. For example, RFID tags can be included on prescription medication containers so that genuine pharmaceuticals can be distinguished from grey market or black market drugs. Likewise, authenticating tags can be included in premium consumer products such as handbags to differentiate genuine articles from imitations.

However, there are also circumstances in which it would be useful to include an RFID tag which would be non-transmissive (that is, would not provide a response to a reader) until the product package is opened. For example, it would be desirable to include an RFID tag in a collectable item (e.g., a baseball card) which can readily authenticate the item as a genuine collectable, yet which does not reveal the contents of the package until the item's packaging has been opened. There are also circumstances in which it would be beneficial to have the response state of an RFID tag conditioned on the position of a latch or other mechanical element. For example, if a window latch were to include an RFID tag that passively announces whether the window is in a locked or unlocked state, then home security could be improved. The present invention addresses these and other needs.

SUMMARY OF THE INVENTION

In accordance with one aspect of the present invention, a tag responsive to a transmitted signal comprises a dielectric substrate and an antenna supported on the substrate which defines an antenna pattern having a first electrical length. The tag in accordance with this aspect of the invention includes at least a first electrical contact at a first location along the antenna and, optionally, multiple electrical contacts at respective multiple locations along the antenna. A conductive shunt conductively contacts the antenna at least at the first location and extends from the first location so as to define an antenna pattern having a second electrical length that is different than the first electrical length for so long as the conductive shunt remains in conductive contact with the antenna. A carrier is affixed to the shunt with a connection which is stronger than the conductive contact of the shunt to the antenna. Any movement of the carrier away from the substrate separates the conductive contact of the shunt to the antenna to restore the first electrical length of the antenna pattern.

In more particular arrangements in accordance with this aspect of the invention, the tag can have one or more of the following features. The tag can have a second electrical contact which provides conductive contact to the antenna at a second location along the antenna which is located so as to be in physical contact with the shunt while the shunt contacts the first electrical contact. The second electrical length in this arrangement results from an electrical short between the first electrical contact and the second electrical contact. Also, the substrate of the tag can comprise a material that dielectrically loads the antenna such that the antenna pattern has a physical length corresponding to the first electrical length that is less than would be required of the same antenna pattern in free space. Also, the conductive contact between the shunt and the antenna can comprise a mechanical connection, and the mechanical connection can be a laser weld or a solder joint. Also, the shunt can comprise a conductive material that differs from that of the antenna. Also, a non-conductive film can overlie the antenna except at the locations of the electrical contacts. Also, the carrier can have a surface opposite the conductive shunt which includes a landing pad, and an adhesive can be affixed to the landing pad.

An RFID tag constructed in accordance with this aspect of the invention can include a semiconductor chip supported on the substrate in electrical communication with the antenna. In such chip-based arrangements, the chip can have a ground potential contact which is located so as to be in conductive contact with the shunt while the shunt contacts the first electrical contact. The second electrical length in this arrangement results from an electrical short between the first electrical contact and the ground potential. Also in chip-based arrangements, an impedance of an antenna port of the semiconductor chip can be matched to the first electrical length within a prescribed tolerance and the second electrical length can be outside of the prescribed tolerance. Also, the antenna can connect directly to the semiconductor chip, or indirectly via an impedance matching network or circuit.

In a particular embodiment in accordance with this aspect of the invention, the substrate can comprise a layer of a trading card, and a semiconductor chip is provided which contains a signature that assists in authenticating the trading card. The signature is interrogatable by way of signal transmission through the antenna after removal of the conductive shunt.

In accordance with another aspect of the invention, a state machine selectively alters the antenna characteristic of an RFID tag between a transmissive and non-transmissive state. The transmissive state exists when the antenna has the first electrical length and the non-transmissive state exists when the antenna has the second electrical length. In an embodiment constructed in accordance with this aspect of the invention, the carrier includes hardware moveable relative to a mount along a prescribed path. Movement of the hardware along the prescribed path in a first direction separates the conductive contact of the shunt from the antenna to restore the first electrical length of the antenna pattern and thereby place the tag in a transmissive state. Also, if permitted, movement of the hardware along the prescribed path in a second direction different than the first direction to a particular position can cause the conductive shunt to contact the antenna and maintain the antenna pattern at the second electrical length and thereby place the tag in a non-transmissive state.

In accordance with another aspect of the present invention, a packaged tag-bearing product comprises a tag including an antenna having an antenna pattern which is supported in fixed position relative to the product. A removable, conductive shunt is positioned in conductive contact with at least one location on the antenna. Packaging is disposed in surrounding relationship to the tag and the shunt and has a closed configuration in which the packaging precludes disruption of the contact between the at least one location and the shunt. In a preferred implementation of this aspect of the invention, the tag responds to an electromagnetic signal of one or more prescribed frequencies with a signature signal only after the shunt has been removed. The packaging can be mechanically coupled to the shunt so that removal of the packaging from the product disrupts the contact between the at least one location and the shunt. Alternatively, the tag can have a carrier affixed to the shunt which is independent of the packaging, with the carrier also being concealed when the packaging is in the closed configuration.

In accordance with still another aspect of the present invention, a method is provided for enhancing an RFID tag for selective operation. In this method, a tag comprising an antenna having a first electrical length is disposed on a dielectric substrate. The tag is processed for selective operation by modifying its basic structural configuration. First, at least a first electrical contact is provided at a first location along the antenna. Next, a removable conductive shunt is disposed in conductive contact with the antenna at least at the first location so as to extend from the first location and define an antenna pattern having a second electrical length that is different than the first electrical length for so long as the conductive shunt remains in conductive contact with the antenna. A carrier is affixed to the shunt, before or after the disposing step, and has a connection to the shunt which is stronger than the conductive contact of the shunt to the antenna. The carrier permits subsequent removal of the shunt from at least the first location, and thereby permits selective restoration of the first electrical length of the antenna.

These and other features, aspects and advantages can be appreciated from the following written description and the accompanying drawing figures.

BRIEF DESCRIPTION OF THE DRAWINGS

FIG. 7 is a perspective view of a two-state mechanism in the form of a strike plate which includes a tag substantially as shown in FIG. 1;

FIG. 7A is a detail view, taken in cross-section taken along line 7A-7A of FIG. 7, showing movement of a deadbolt latch in a direction that shunts the tag;

FIG. 8 is a schematic illustration of an alarm system adapted to read the states of state machines such as depicted in FIGS. 6 and 7; and FIG. 9 shows an adhesive label bearing an RFID tag, such as depicted in FIG. 1, supported together with a machine readable code.

DESCRIPTION OF CERTAIN EMBODIMENTS

Figure 1:
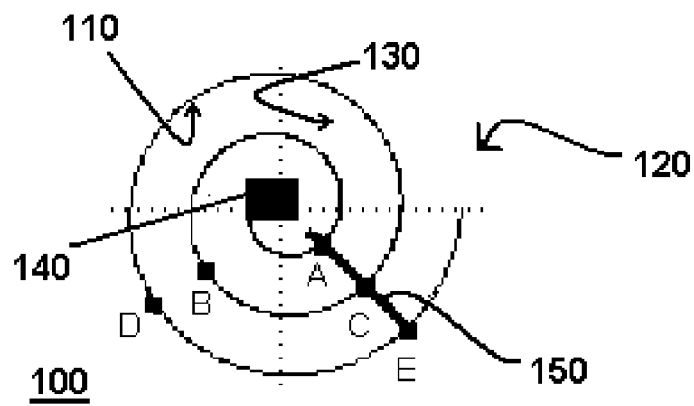
FIG. 1 is a top schematic view of a tag showing a first arrangement for a shunt.

In the embodiment of FIG. 1, a passive RFID tag 100 includes a tracing 110 of conductive material which is arranged in a pattern to define an antenna 120 having a prescribed (first) electrical length. The antenna is laid out to preferably maximize the electrical length of the antenna in order to increase the antenna's sensitivity to low-amplitude signals from the reader, and has an overall electrical length that is preferably matched to the frequency of the reader with which it operates. A useful and preferred pattern is a planar loop such as a spiral as illustrated in FIG. 1 or a spiral of other shape (e.g., rectilinear). Between portions of the tracing 110 is a non-conductive supporting substrate 130. The antenna 120 couples a signal from a reader (e.g., by induction or E-field capacitance) to an antenna input of a semiconductor chip 140, and generates a small voltage potential signal for powering the chip. The potential signal coupled by the antenna 120 provides energy (current) sufficient for the chip 140 to respond to interrogation by such radio signals with a weak radio signal response, for example, a predetermined numeric code that has been programmed into a memory (not shown) of the chip 140, or to respond with a reflection of a modulated, encoded identification, or with backscattered modulation of the original signal (e.g., of the same, greater, or lesser signal strength).

The tag 100 alternatively can be an active tag construction which incorporates a battery to transmit a signal to a reader antenna. Active tags either emit a signal at a predefined interval or transmit only when addressed by a reader. Either way, the battery provides the power for RF transmissions, instead of the tag using an inductive or capacitive coupling for such power. In all respects relevant to the antenna pattern, however, active RFID tags can be constructed the same as the passive tag of FIG. 1.

The tracing 110 that comprises the antenna is preferably a metal such as copper or aluminum, but alternatively can be a conductive polymer. The antenna can be defined by an etching process such as one performed with the aid of photolithographic masks to remove conductive material and leave behind the desired pattern for the antenna 120. Except as provided at pads or contacts as noted below, the tracing 110 is preferably coated with a non-conductive film to reduce the risk of physical or chemical damage to the antenna.

The semiconductor chip 140 is preferably protected by a resin outer coating. The chip 140 has a memory (not shown) that can be physically and logically divided into cells: some of the cells can store data for read-only operations, such as cells that store unique serial numbers written at the production stage, while others can be both written to and read repeatedly to provide intelligent responses, such as responses that vary based on programming or re-programming supplied to the chip 140 by the reader (not shown), e.g., to identify times of delivery at each stage of a parcel's delivery chain. The signals that prompt a response from the chip 140 can be in any one of a number of frequency ranges including but not limited to 125 KHz, 134 KHz, 13.56 MHz, 958 MHz, the 2.4 GHz Bluetooth standard, and at higher frequencies in accordance with any number of standards regarding RFID systems, including, by way of illustration: ISO 15693, ISO 18000 (for item-level tracking at 13.56 MHz), and ISO 18000-6.

In a fabricated tag 100, the primary supporting substrate 130 can be a polyester film such as PET, some other polymer film, a paper backing layer, or other non-conductive surface that provides a dielectric support for the antenna pattern. The supporting substrate provides a dielectric load $\in_r$ to the antenna pattern 120 so that the antenna can achieve a prescribed electrical length using a shorter physical length than otherwise would be required if the same antenna pattern were disposed in free space. For some applications, such as when the tag substrate is to be attached to a metal surface, the supporting substrate should be of a material or composite substrate construction that ensures that the underlying metal surface does not significantly reduce the flux in the emitted field of the reader.

In accordance with a salient aspect of the invention, the RFID tag 100 further includes a removable shunt 150 that selectively makes electrical contact with the tracing 110. Contact between the shunt and the tracing is such that the shunt alters the electrical characteristics of the antenna pattern 120. For example, conductive contact with the shunt changes the electrical length of the antenna pattern from the prescribed, first electrical length to a different, second electrical length. Preferably, such contact also causes an impedance mismatch to any downstream circuitry outside of a prescribed tolerance or range. The shunt 150 can be made of a conductive material, such as any of the materials that are suitable for the tracing 110. Optionally, the shunt 150 comprises a conductive material that differs from that of the tracing 110. The contact is preferably a mechanical connection and more preferably is a disruptable solder joint or a laser weld.

Figure 2:
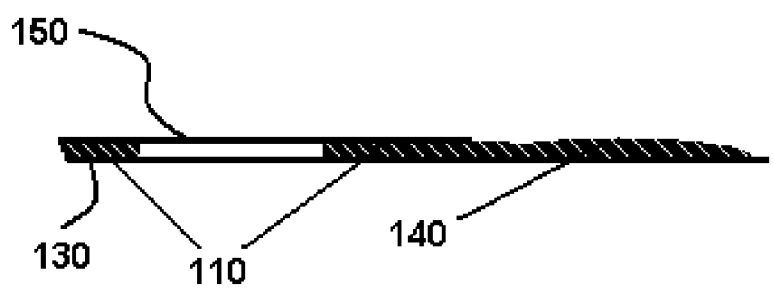
FIG. 2 is a side schematic view of the tag of FIG. 1.

FIG. 2 illustrates a side view of the RFID tag 100 with the shunt 150 in conductive contact with a plurality of portions of the conductive tracing 110. By contacting the tracing 110, the shunt 150 alters the electrical length of the antenna 120. It can be sufficient to position the shunt 150 so as to contact two selected portions of the conductive tracing 110 as that will alter the response of the tag 100 to a radio stimulus. More particularly, the shunt 150 changes the effective electrical length of the antenna so as to render the antenna ineffective in coupling sufficient power from a suitable stimulus signal (that is, a signal that is radiated within a prescribed operating frequency range for that tag). Most preferably, the conductive shunt divides the overall antenna length into multiple, shunted lengths, wherein the shunt and antenna portion together define one or more closed loop segments which is(are) substantially less effective than the prescribed electrical length of the antenna in terms of ability to couple a signal from the complementary reader. For example, the unshunted antenna pattern 120 of FIG. 1 provides a dipole antenna that extends from around A to B to C to D to E and beyond. However, with the shunt 150 conductively contacting the antenna at locations A, C and E, the shunt alters the antenna as follows:

There is now a direct path from A to C;
There is now a closed loop from A to B to C;
There is now a direct path from C to E; and
There is now a closed loop from C to D to E;

Thus, inclusion of the shunt in electrical contact with multiple portions of the antenna 120 is effective in altering the antenna characteristic so as to preclude the RFID tag from responding to external stimuli. As described below, the locations A, C and E can comprise conductive pads 180.

Figure 3:
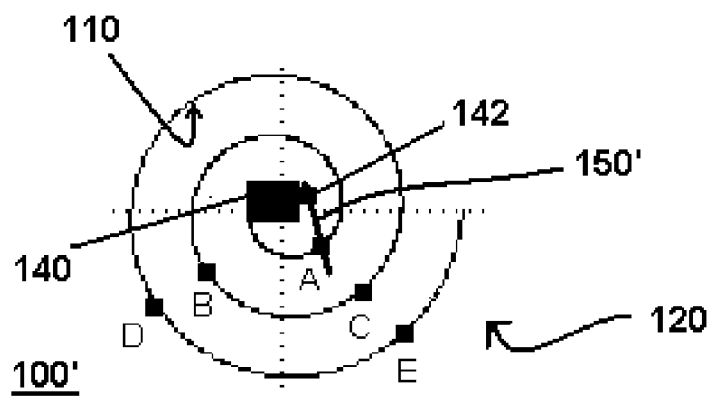
FIG. 3 is a top schematic view of a tag showing a different arrangement for the shunt.

For chip-based tag designs, the shunt 150 can be arranged to bring one or more portions of the antenna 120 into electrical contact with a ground terminal 142 of the chip 140, if accessible, in order to alter the electrical characteristics of the antenna pattern 120 and render the chip 140 unable to interact with any external stimuli. In FIG. 3, tag 100' has the shunt 150' making electrical contact with the ground terminal 142 and with the pad 180 (location A) in order to short the antenna port of the chip to ground potential.

The alteration in antenna characteristic also disrupts a desired match between the antenna and its feed line (the portion of the conductive tracing 110 leading to the antenna pattern 120 from the chip 140). A match is proper and complete when the antenna impedance is matched to the feed line impedance at least within a prescribed tolerance (e.g., $\pm 100\Omega$, $\pm 50\Omega$, etc.). This conventionally requires the use of a matching network between the feed line and the antenna. When the shunt is in electrical contact with two or more portions of the antenna or the ground potential and at least one contact point on the antenna, the match is disrupted from the degree of matching achieved in the unshunted antenna pattern, and the radiation pattern of the antenna is altered.

Conventionally, a tag includes a matched connection between the antenna 120 and the semiconductor chip 140; however, a matching network forms no part of the present invention, though it may in fact be included between a given antenna pattern 120 and the chip 140. For ease of discussion, the antenna is described herein as being connected to an antenna port of the chip 140, albeit, potentially through an indirect connection by way of a matching network.

Figure 4:
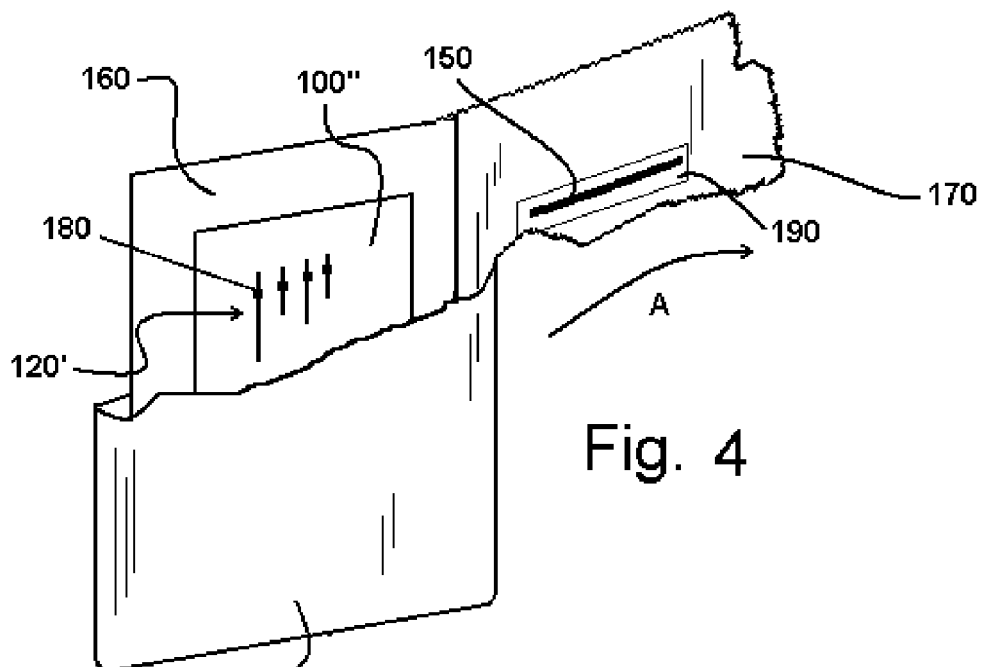
FIG. 4 is a perspective view of a selectively-shunted tag disposed on an item and within surrounding packaging.

FIG. 4 illustrates a packaged item 160 including an RFID tag construction having a selectively removable shunt. The item 160 has a layer that serves as a primary support for a particular construction of a tag 100" which includes at least the antenna 120' on a surface thereof. The illustrated item 160 is a collectable item such as a baseball card; however, any product can be packaged as the item 160. In FIG. 4, tag 100" is a chipless design, having the antenna 120' comprising a pattern of electromagnetic reflective fibers that serves as the shuntable tracings 110. Chipless constructions create unique interference patterns created using resonant fibers, structures or chemicals made available by companies such as Inkode of Vienna, Virginia or CrossID of Kiryat Ono, Israel. Alternatively, the tag 100" can be the same construction as tags 100, 100' illustrated in FIGS. 1 and 3. For a baseball card, the tag 100' can be on a rear surface. For other items that interact with machines, such as compact discs, digital video discs, and memory cards, the removable shunt portion of the tag 100" can be located such that it must be removed in order to place the item into service.

The item 160 is contained within packaging 170 which preferably conceals the item from view until purchased. The packaging also precludes access to the tag. An interior portion of the packaging 170 includes a secondary support 190 for the shunt 150, which is positioned to be in register with one or more pads 180 that provide at least one and preferably two electrically conductive contact points to particular portions of the tracing 110. Any pad 180 that is provided is free of any insulation or overlying non-conductive film and may have an increased thickness relative to remaining portions of the tracing 110, if desired. The pad can be provided, for example, by removal of a non-conductive film that overlies the location of the pad, or by including an overlying film that has an aperture in register with the antenna at least at the pad location or locations. The shunt physically contacts the antenna portion 120 at the one or more pads, and, as noted above, the contact is preferably a mechanical, conductive connection and more preferably is a disruptable solder joint or a laser weld.

As illustrated, the shunt 150 is supported on a carrier 190. The carrier 190 can be affixed to the packaging 170, such that removal of the packaging from the item 160 disrupts the mechanical connection between the shunt and the antenna, thereby activating the tag so as to be interactive with external readers. In an alternative arrangement, the shunt can be supported directly upon an interior surface of the packaging 170, though that requires alignment of the item and the packaging to ensure that the shunt contacts pads 180.

The shunt 150 and its carrier 190 need not be affixed to the packaging 170. In this arrangement, the packaging 170 can be opened and the tag 100" can remain physically associated with the item 160 until the carrier 190 is moved away from the supporting layer of the item 160. Until the carrier 190 is separated from the tag 100", the tag does not respond to stimuli and the product is in a "new," non-transmissive state. As a non-limiting example, the carrier 190 can be positioned so that use of the product requires removal of the carrier 190 (e.g., to expose information or to permit the item to interact with another device). Such removal restores the antenna to its unshunted condition, and hence actuates the tag 100" to a transmissive state in which it can effectively respond to the frequency of operation of the reader that complements the tag 100". Thus, once the carrier 190 has been removed, the tag 100" has been actuated and the product is placed in a "used," transmissive state.

The connection between the shunt and its supporting substrate (namely, the carrier 190 or the packaging 170) is preferably stronger than the physical connection to the contact pads 180. This results in a preferential separation of the shunt from the antenna 120, 120' in response to a shearing or tensile force that may be applied in order to remove the shunt from the tag 100, 100', 100".

FIG. 4 further illustrates the packaging 170 partially separated from the item 160 so as to separate the shunt 150 from the antenna 120'. When the packaging 170 is intact, the shunt 150 physically abuts and conductively contacts the pads 180, thereby precluding the tag 100" from responding to a stimulus signal in the prescribed frequency range for that tag. However, when the packaging 170 or carrier 190 is removed from the item (e.g., by peeling away in the direction of arrow A), the shunt 150 separates from the tracing 110 and the antenna is again operative, preferably at its maximum electrical length, to respond to any stimulus signal in the prescribed operating frequency range. In this way, the identity of the item 160 can be numerically coded into the chip 140 or a reflected identification can be sent back to the reader for authentication by an RFID scanning system, yet the item's identity can be squelched and remain concealed from prospective purchasers until the packaging 170 is removed.

Figure 5:
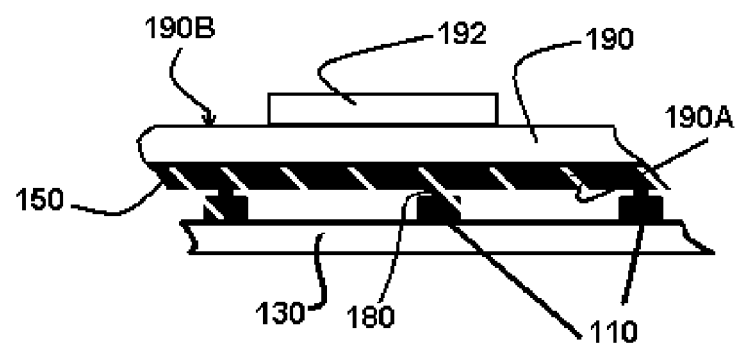
FIG. 5 is a detailed, side schematic view of the shunt supported relative to a tag.

FIG. 5 is a side view in greater detail showing the shunt 150. The shunt 150 is shown contacting the tracing 110 at a number of locations via intervening conductive pads 180. The shunt is supported on a secondary substrate or carrier 190. The carrier has a first surface 190A which makes good contact with the shunt 150 such that the shear strength of the carrier/shunt interface is greater than the shear strength of the shunt/pad interface. The relative strength of contact between the shunt and the carrier as compared to the shunt and the tracings results in preferential breaking of the shunt/pad interfaces, thereby to restore the antenna 120 to its operative (non-shunted) configuration, with movement of the carrier 190 away from the substrate 130. The carrier also has a second surface 190B which provides a landing pad for affixing to another article such as the packaging 170 using an adhesive or chemical bond 192.

A state machine in accordance with another aspect of the invention selectively alters the antenna characteristic of an RFID tag between a transmissive and non-transmissive state. The transmissive state exists when the antenna has a first electrical length and the non-transmissive state exists when the antenna has a different, second electrical length, as described above. In an application of a tag that has been constructed in accordance with FIG. 1, the tracing 110 and the conductive shunt 150 are disposed on separate elements that move relative to each other along a prescribed path to define a two-sate machine.

Figure 6:
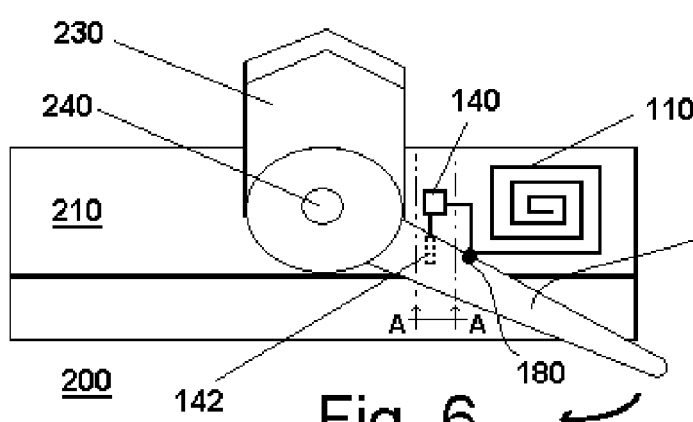
FIG. 6 is a top plan view of a two-state mechanism in the form of a window latch which includes a tag substantially as shown in FIG. 1.

A state machine having an RFID tag applied can be used in a variety of applications. One exemplary application is to a security system which has one or more RFID tag readers as inputs to the system. In that application, RFID readers are configured to interrogate certain (active or passive) RFID tags associated with state machines whose states are to be monitored to ensure that premises are secure. Two state machines are shown in FIGS. 6 and 7 (connected to a window and to a door, respectively) as non-limiting examples of an RFID tag in accordance with the invention applied to such state machines. In security systems such as alarm systems that monitor intrusion into a home or business, the system can be set to an "armed" mode when each window and door wired to the system is shut. A common problem, however, is that a window or door may be shut, but not locked. While movement of the door or window nevertheless can trigger the system to sound an alarm or summon for help, it is desirable to have such a system report whether any of the doors or windows that are being monitored is actually locked, rather than just being closed.

Figure 6A:
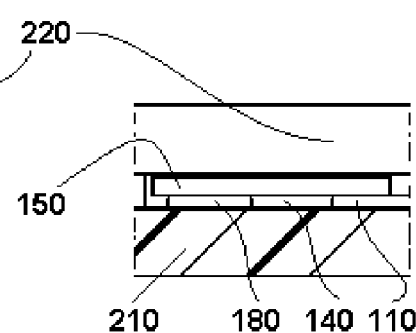
FIG. 6A is a side view taken along line A-A of FIG. 6 showing engagement of the shunt with the antenna of the tag.

The state machine of FIGS. 6 and 6A illustrate a passive system (no power connections required) that can cooperate with an external reader that may be coupled to a security system to differentiate the locked and unlocked states of a window. The state machine of FIG. 7 illustrates another passive system which is configured to differentiate the latched and unlatched states of a deadbolt door lock. The particular state machines illustrated in these figures can be interrogated by an RFID tag reader which has been connected so as to provide signals to a security system and thereby report the locked/unlocked or latched/unlatched state of the various portals (e.g., windows and doors) that are being monitored. As will be appreciated, the use of RFID tags according to the invention permits the reporting of the locked/unlocked or latched/unlatched states of portals without requiring electrical wires to be run directly to the individual portals. Instead, an RFID reader can be positioned centrally relative to several portals that are within a prescribed distance of the reader, and that reader can interrogate the state machines within its range and report its findings to the alarm system. In this way, the alarm system can inform its user whether certain doors and windows are actually locked, rather than simply permit the system to arm itself while one or more monitored windows or doors is not, in fact, locked. Further, the alarm system can differentiate among the windows and doors (via a unique signature of each RFID tag) and report which of the window(s)/door(s) are not locked, if any.

Referring now to FIG. 6, a mount 210 and hardware moveable relative to the mount comprise components of a window latch 200 that may be augmented in accordance with an application of the invention to include the tag of FIG. 1. In this illustrated application, the mount 210 has a surface that is affixed in a conventional manner to an object such as a window, door or doorframe. The object has a second, opposing surface (as shown) that supports the tag (including a dielectric substrate for the antenna). The carrier 190 in this arrangement comprises the hardware that is joined to the mount 210 at a pivot 240 and includes, in the illustrated latch, a manually engageable lever 220 and a blade 230 that is coupled to the lever. The blade in the illustrated position is disposable in a slot of another object (e.g., a complementary window or door structure) in order to preclude relative movement of the objects. Thus, for example, double hung windows or sliding glass doors can be locked together by positioning the blade 230 as shown. The lever 220 is moveable in a first direction as shown by the arrow to rotate the blade to a position that overlies the mount 210 so as to no longer lock or impede movement of the objects. The lever moves along a prescribed path, such as permitted by the pivot 240 or by a track or by other structure provided with the mount 210.

As shown in FIG. 6A, the lever 220 is the carrier which moves the conductive shunt 150. The shunt depends below the lever so that the shunt can be positioned so as to contact one or more electrically conductive pads 180/ground terminals 142 associated with the tag. The shunt 150 is thus positionable with movement of the lever 220 in the first direction along the prescribed path so as to separate the conductive contact of the shunt 150 from the antenna to restore the first electrical length of the antenna. Likewise, the lever 220 is movable in the opposite direction to a particular position at which the shunt 150 is placed in contact with one or more locations of the tracing 110 via conductive pads 180 that permit electrical contact among a portion of the tracing 110 and the ground terminal of the chip 140 and/or among multiple portions of the tracing 110. When the shunt contacts the tracing and/or ground terminal, the shunt contacts the antenna and maintains the antenna at the second electrical length.

In alternative yet equivalent arrangements, the mount can support the conductive shunt and the lever can support the tag, and/or the tag can be the tag 100″ of FIG. 4.

FIGS. 7 and 7A illustrate a state machine in which an RFID tag is selectively shunted as a function of the position of a deadbolt latch. The state machine of this embodiment comprises, in general terms, an RFID tag 100 supported on a strike plate 300 and a resiliently flexible, conductive shunt 250 that is selectively urged by the deadbolt latch into contact with tracings 110 of the tag. To maximize signal transmission, the antenna 120 is most preferably supported on a flange 310 of the strike plate, at a location that is exposed away from or displaced from materials that might interfere with communication with an external reader. In FIG. 7, the antenna is shown supported on an underside of the strike plate flange. Contacts 180 or contact pads 142 are provided, as previously described, in register with the conductive shunt 250. The shunt 250 is normally spaced from the tracing 110 such that the antenna 120 of the RFID tag has a first electrical length suitable for communication with an external reader at a prescribed frequency of operation when the deadbolt latch 320 is retracted from the strike plate 300.

FIG. 7A illustrates in detail movement of the deadbolt latch 320 in the direction of arrow B in order to lock the door (shown in a partial, sectional view). Movement in the direction of arrow B occurs when the deadbolt latch is thrown toward the latched position from a recessed position within the door. As a result of such movement, the conductive shunt 250 is urged against a restoring force, that is, either its own resilient restoring force or the restoring force provided by a bias provided by a spring or another resilient element. The shunt 250 moves in the direction of arrow C into conductive contact with the tracing 110 at the contacts 180, contact pads 142 or elsewhere. The contacts and/or contact pads are preferably supported on a surface 330 of the strike plate 300. The surface 330 is preferably immovable relative to the conductive shunt. When the conductive shunt is in contact with the tracing(s) 110, the antenna is shunted, thereby altering the antenna characteristic, as described above, so as to preclude the RFID tag from responding to external stimuli communication with the external reader at the frequency of operation. In this way, the conductive shunt 250 operates as a momentary contact switch, whose state is a function of the position of the deadbolt latch 320.

The state machine of FIGS. 7 and 7A can be mounted within a conventional door frame simply by replacing a standard strike plate with the strike plate 300, described above.

As will be understood, the RFID tag can be in a shunted state when the latch is unlocked (deadbolt not thrown), with the conductive shunt being urged clear of conductive contact with the tracing 110 when the latch is thrown. This can be achieved by arranging the foregoing components in an appropriate manner as appreciated by those of ordinary skill in the mechanical arts. Also, in an equivalent arrangement, the immovable surface 330 can support the conductive shunt and the resiliently moveable shunt can instead support the contacts 180 and/or 142, without departing from the manner of operation described above.

Referring now to FIG. 8, an alarm system 400 of conventional design has an RFID tag reader 410 as one of several inputs that provide state information that the system 400 monitors. Changes in state can trigger the alarm system on an immediate or delayed basis. The trigger can alert persons of a variety of detected conditions, such as movement of an intruder in the protected premises, existence of carbon monoxide, or opening of a window or door. The RFID tag reader 410 provides signals to the system 400 by a wired connection (as shown) or wirelessly. The RFID tag reader is disposed at a central location near one or more windows and doors and interrogates tags within its range, for example, tags supported on a window latch or strike plate in order to discern their state (locked or unlocked). Preferably, each strike plate and window latch has a unique signature so that the RFID tag reader 410 associated with those particular windows and doors can report to the system 400 which signals have been received. In turn, the system 400 identifies through one or more control panels which window or door is in a locked state and which, if any, are in an unlocked state. For example, the locked state as illustrated in FIGS. 6 and 7 causes the illustrated antenna to be shunted. When the antenna is shunted, the RFID tag reader 410 will not receive signals. Of course, the reader can instead receive signals when a given door or window is locked. In either arrangement, however, the locked or unlocked state can be monitored centrally by the alarm system 400 without requiring electricity or battery power at the strike plate, window latch, or other state machine constructed in accordance with the foregoing description.

FIG. 9 illustrates a label 500, preferably with a backing 510 adhesively attached to a rear surface 520 of the label, which supports an RFID tag 100 as previously described. Overlying at least a portion of the tag 100 is a removable film 590 which serves as a carrier for a conductive shunt 550. Carrier film 590 and shunt 550 can be constructed in the same manner as carrier 190 and shunt 150. When the carrier film 590 is separated from the label 500, the shunt 550 is removed from conductive contact with the tracings 110 of the RFID tag 100, and the RFID tag has a first electrical length which is suitable for communication with an external reader at a prescribed frequency of operation, for example, to announce a unique signature associated with that tag. However, prior to removal of the film 590, the shunt 550 is in conductive contact with the tracings 110 of the RFID tag 100 so as to cause the tag to have a second electrical length which precludes communication with the external reader at the prescribed frequency of operation.

Also supported on a front surface of the label 500 is a machine-readable code 530 which is matched to the unique signature of the RFID tag. The bar code is matched to the RFID tag's unique signature in that the bar code and RFID signature can be coordinated within a programmed machine. For example, the RFID signature, when interrogated, can resolve into a binary code and the machine code can encode the same binary sequence. The match of the RFID signature to the bar code permits the bar code 530 from one of a multiplicity of labels 500 to be scanned and affixed to an item, with the RFID tag being activatable at any time (including a significantly later time, if desired) and thereby providing the option of identifying the item either by the bar code (a direct optical read) or by interrogating the RFID tag (which can be by interrogation from a distance, including parallel interrogation of multiple tags).

The item to which the label 500 can be attached forms no part of the present invention, but by way of example can be a carton, a file, a patient, a building visitor, or other animate or inanimate object.

A practical implementation of an RFID tag constructed in accordance with the invention preferably includes an anti-collision protocol which allows multiple tags to be read by a single reader simultaneously. Without anti-collision, multiple tags will interfere with each other preventing the reader from recognizing the tags.

While the invention has been illustrated in detail with particular reference to certain embodiments thereof, and described in connection with the illustrated embodiments and variations thereof, the invention is capable of different embodiments and insubstantial variations, and its details are capable of modifications in various obvious respects, including using parts of one embodiment in connection with another embodiment. As will be readily apparent to those skilled in the art, variations and modifications can be affected while remaining within the spirit and scope of the invention. Accordingly, the accompanying drawing figures and the foregoing written description of certain embodiments and their variations are for illustrative purposes only, and do not in any way limit the invention, which is defined only by the claims.

What is claimed is:

1. A tag responsive to a transmitted signal, comprising:
    a dielectric substrate;
    an antenna supported on the substrate and defining an antenna pattern having a first electrical length selected to permit wireless interrogation by an external reader at one or more prescribed frequencies;
    at least a first electrical contact at a first location along the antenna;
    a conductive shunt conductively contacting the antenna at least at the first location and extending from the first location so as to define an antenna pattern having a second electrical length that is different than the first electrical length for so long as the conductive shunt remains in conductive contact with the antenna, the second electrical length precluding wireless interrogation by the external reader at the one or more prescribed frequencies; and
    a carrier affixed to the shunt with a connection which is stronger than the conductive contact of the shunt to the antenna, the carrier being selectively movable away from the substrate to separate the conductive contact of the shunt to the antenna and restore the first electrical length of the antenna pattern.

2. The tag of claim 1, further comprising a second electrical contact providing conductive contact to the antenna at a second location along the antenna which is located so as to be in physical contact with the shunt while the shunt contacts the first electrical contact, wherein the second electrical length is due at least in part to an electrical short between the first electrical contact and the second electrical contact.

3. The tag of claim 1, further comprising a semiconductor chip supported on the substrate in electrical communication with the antenna, wherein the semiconductor chip has a ground potential contact which is located so as to be in conductive contact with the shunt while the shunt contacts the first electrical contact, wherein the second electrical length results from an electrical short between the first electrical contact and the ground potential.

4. The tag of claim 3, wherein semiconductor chip has an antenna port having an impedance and wherein the first electrical length is matched to the impedance within a prescribed tolerance and wherein the second electrical length is outside of the prescribed tolerance.

5. The tag of claim 1, further comprising a semiconductor chip supported on the substrate in electrical communication with the antenna so as to produce a unique signature in response to interrogation by the external reader at the one or more prescribed frequencies, wherein the substrate comprises a label, and wherein the label supports a machine-readable code which is matched to the unique signature.

6. The tag of claim 1, wherein the shunt comprises a conductive material that differs from that of the antenna.

7. The tag of claim 1, further comprising a non-conductive film overlying the antenna except at the locations of the electrical contacts.

8. The tag of claim 1, further comprising a semiconductor chip supported on the substrate in electrical communication with the antenna, wherein the substrate comprises a layer of a trading card, wherein the semiconductor chip contains a signature that assists in authenticating the trading card, the signature being interrogatable by way of signal transmission through the antenna after removal of the conductive shunt.

9. The tag of claim 1, further comprising a mount, wherein the carrier includes hardware moveable relative to the mount along a prescribed path, wherein movement of the hardware along the prescribed path in a first direction separates the conductive contact of the shunt from the antenna to restore the first electrical length of the antenna pattern.

10. The tag of claim 9, wherein movement of the hardware along the prescribed path in a second direction different than the first direction to a particular position causes the conductive shunt to contact the antenna and maintain the antenna pattern at the second electrical length.

11. A packaged tag-bearing product, comprising:
    a tag including an antenna having an antenna pattern which is supported in fixed position relative to the product;
    a removable, conductive shunt positioned in conductive contact with at least one location on the antenna; and
    packaging disposed in surrounding relationship to the tag and the shunt, the packaging having a closed configuration in which the packaging precludes disruption of the contact between the at least one location and the shunt, wherein, in the presence of an electromagnetic signal of one or more prescribed frequencies, the tag responds with a signature signal only after the shunt has been removed.

12. The product of claim 11, wherein the packaging is mechanically coupled to the shunt such that removal of the packaging from the product disrupts the contact between the at least one location and the shunt.

13. The product of claim 11, further comprising a carrier affixed to the shunt which is independent of the packaging, wherein the carrier is concealed when the packaging is in the closed configuration.

14. A method for enhancing an RFID tag for selective operation, the tag comprising an antenna having a first electrical length disposed on a dielectric substrate, the first electrical length being selected to permit wireless interrogation by an external reader at one or more prescribed frequencies, comprising the steps of:

provide at least a first electrical contact at a first location along the antenna;

disposing a removable conductive shunt in conductive contact with the antenna at least at the first location and extending from the first location so as to define an antenna pattern having a second electrical length that is different than the first electrical length for so long as the conductive shunt remains in conductive contact with the antenna, the second electrical length precluding wireless interrogation by the external reader at the one or more prescribed frequencies; and affixing a carrier to the shunt with a connection which is stronger than the conductive contact of the shunt to the antenna, yet which is selectively separable from the shunt, so as to permit selective restoration of the first electrical length of the antenna.

15. A tag constructed to have a non-transmissive state and a transmissive state, comprising:

a dielectric substrate;

an antenna supported on the substrate and defining an antenna pattern having a first electrical length selected to permit wireless interrogation by an external reader at one or more prescribed frequencies;

at least a first electrical contact at a first location along the antenna;

a conductive shunt conductively contacting the antenna at least at the first location and extending from the first location so as to define an antenna pattern having a second electrical length that is different than the first electrical length and in which wireless interrogation at the one or more prescribed frequencies is precluded; and a disruptable mechanical connection made between the conductive shunt and at least the first location of the antenna, the connection establishing the non-transmissive state in which the antenna has the second electrical length and being disruptable to separate the conductive shunt from the antenna so as to thereafter establish the transmissive state in which the first electrical length of the antenna is restored.

16. The tag of claim 15, further comprising a second electrical contact providing conductive contact to the antenna at a second location along the antenna which is located so as to be in physical contact with the shunt while the shunt contacts the first electrical contact, wherein the second electrical length is due at least in part to an electrical short between the first electrical contact and the second electrical contact.

17. The tag of claim 15, further comprising a semiconductor chip supported on the substrate in electrical communication with the antenna, wherein the semiconductor chip has a ground potential contact which is located so as to be in conductive contact with the shunt while the shunt contacts the first electrical contact, wherein the second electrical length results from an electrical short between the first electrical contact and the ground potential.

18. The tag of claim 17, wherein semiconductor chip has an antenna port having an impedance and wherein the first electrical length is matched to the impedance within a prescribed tolerance and wherein the second electrical length is outside of the prescribed tolerance.

19. The tag of claim 15, further comprising a non-conductive film overlying the antenna except at the locations of the electrical contacts.

20. The tag of claim 15, further comprising a semiconductor chip supported on the substrate in electrical communication with the antenna so as to produce a unique signature in response to interrogation by the external reader at the one or more prescribed frequencies only when in the transmissive state, wherein the substrate comprises a label, and wherein the label supports a machine-readable code which is readable in at least the non-transmissive state and which is matched to the unique signature.

21. The tag of claim 15, further comprising a semiconductor chip supported on the substrate in electrical communication with the antenna so as to produce a unique signature in response to interrogation by the external reader at the one or more prescribed frequencies, wherein the unique signature authenticates an object to which the tag is to be attached only when the tag is in the transmissive state.

* * * * *